Feb. 28, 1939. B. H. URSCHEL 2,148,714
AXLE
Filed Dec. 24, 1936 3 Sheets-Sheet 1

Inventor
Bertis H. Urschel
By [signature]
Attorney

Feb. 28, 1939.　　　　B. H. URSCHEL　　　　2,148,714
AXLE
Filed Dec. 24, 1936　　　　3 Sheets-Sheet 2

Inventor
Bertis H. Urschel
By (signature)
Attorney

Feb. 28, 1939.  B. H. URSCHEL  2,148,714
AXLE
Filed Dec. 24, 1936  3 Sheets-Sheet 3

Inventor
Bertis H. Urschel
By (signature)
Attorney

Patented Feb. 28, 1939

2,148,714

UNITED STATES PATENT OFFICE 2,148,714

AXLE

Bertis H. Urschel, Bowling Green, Ohio, assignor to The Urschel Engineering Company, Bowling Green, Ohio, a corporation of Ohio Application December 24, 1936, Serial No. 117,587

1 Claim. (Cl. 301—124)

My invention has for its object to produce load sustaining members having parts shaped and joined to withstand, proportional to their weight, exceedingly great stresses and strains to which the members may be subjected in the uses in which they may be employed. Thus, the invention provides hollow sheet metal truss or strut members having parts that extend lengthwise of the members and laterally and either inwardly or outwardly with respect to the wall parts of the hollow members for withstanding the shearing stresses or bending strains to which the members may be subjected. The members are formed from sheet metal blanks that may be cut and die-pressed to shape them into shells and form integrally connected parts that laterally extend from the walls of the shells and which may be welded together along contacting edge portions of the laterally extending parts.

The invention has particular advantageous application when embodied in load sustaining members that are also subjected to torsional strains, such as in axles of vehicles and particularly such as the axles that are supported on stub axles of guiding wheels which direct the movement of automotive vehicles.

The invention consists in other features which will appear from the following description and upon examination of the drawings forming a part hereof. Structures containing the invention may partake of different forms and may be varied in their details and still embody the invention. To illustrate a practical application of the invention, I have selected a sheet metal, load supporting member and certain modifications thereof as examples of the various structures that contain the invention and shall describe the selected structures hereinafter. The particular structures selected are shown in the accompanying drawings.

Figure 1:
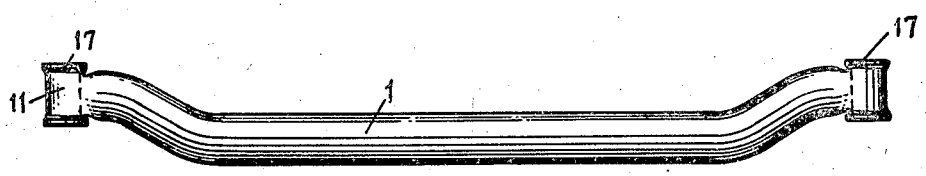
Figure 2:
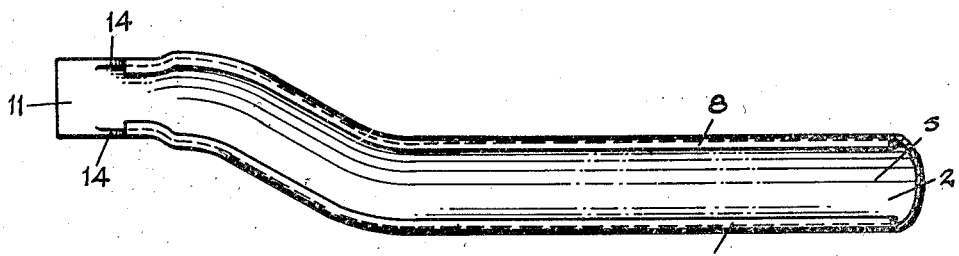
Figure 4:
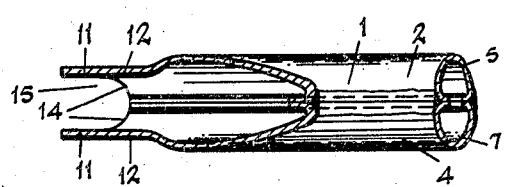
Figure 3:
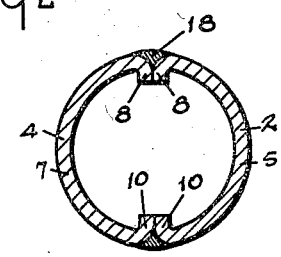
Figure 6:
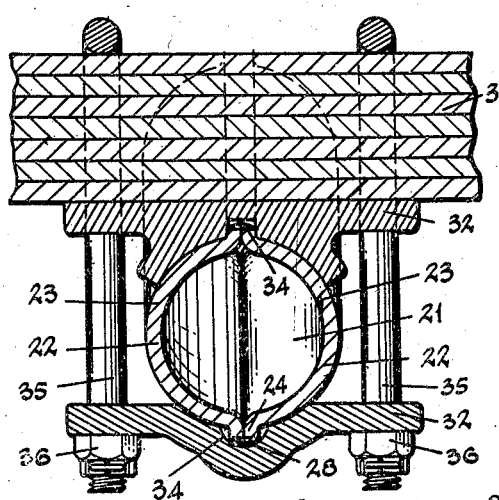
Figure 5:
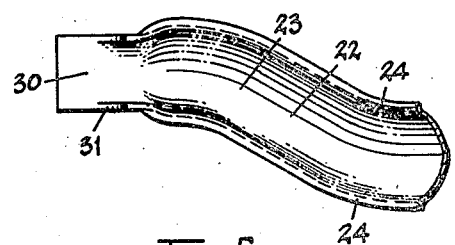
Figure 8:
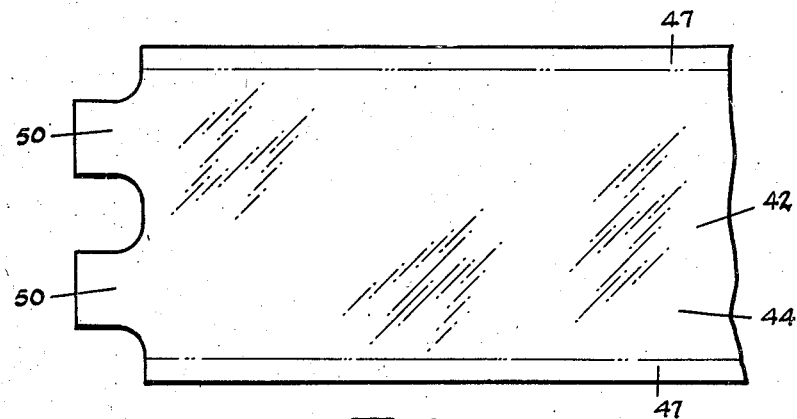
Figure 9:
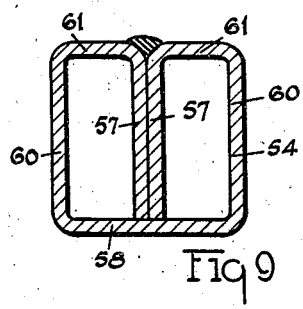
Figure 7:
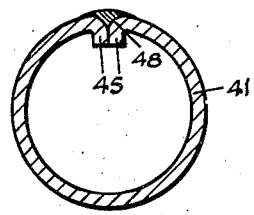
Figure 10:
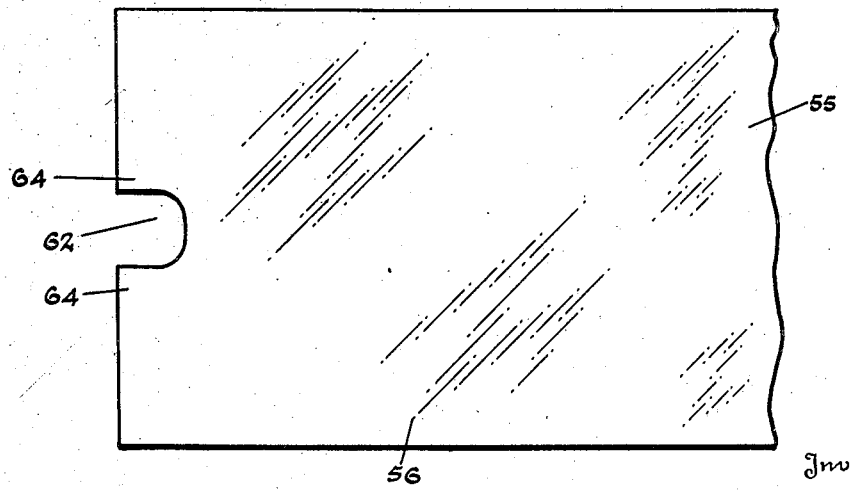
Figure 12:
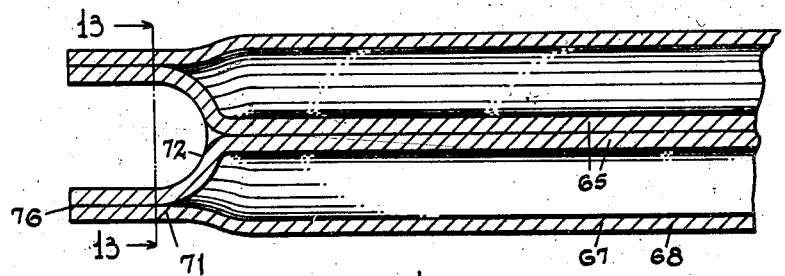
Figure 13:
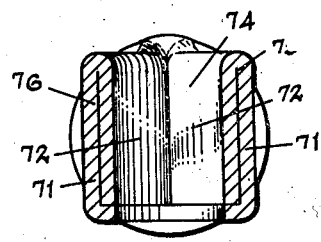
Figure 11:
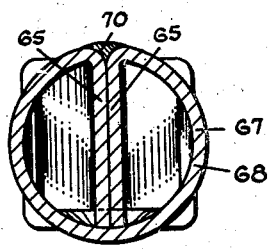
Figure 14:
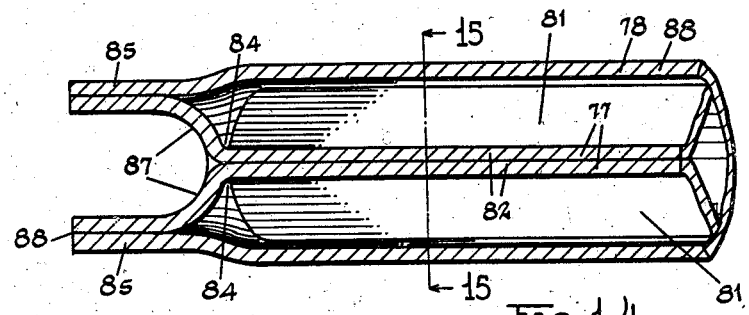
Figure 15:
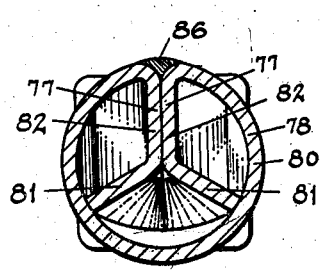

Fig. 1 illustrates a load supporting and torque resisting member in the form of an axle of the type commonly used as front axles in automobiles, trucks, and the like, which are supported by stub axles of the guiding wheels of such vehicles. Fig. 2 illustrates one of the parts of the axle shown in Fig. 1. Fig. 3 illustrates a view of a transverse section of the axle shown in Fig. 1. Fig. 4 illustrates a broken view of the axle and shows the structural formation of the axle. Fig. 5 illustrates a broken view of an end part of a modified form of axle. Fig. 6 illustrates a cross section of the axle of the form shown in Fig. 5 and also means for connecting the axle to the springs of the vehicle. Fig. 7 illustrates a cross section of a further modified form of axle. Fig. 8 illustrates a sheet metal blank from which the axle shown in Fig. 7 may be formed. Fig. 9 illustrates a further modified form of a load supporting member. Fig. 10 illustrates the blank from which the load supporting member or axle shown in Fig. 9 may be formed. Fig. 11 illustrates a transverse section of another modified form of axle. Fig. 12 illustrates a longitudinal section of an end part of the axle illustrated in Fig. 11. Fig. 13 illustrates a section taken on the plane of the line 13—13 indicated in Fig. 12. Fig. 14 illustrates a longitudinal section of an end part of a further modified form of axle. Fig. 15 illustrates a view of a section of the axle shown in Fig. 14 taken on the plane of the line 15—15 indicated in Fig. 14.

The axles selected as examples of embodiments of the invention are so formed that they may be produced at a low labor and material cost and constructed so as to produce a resistance to deformation thereof that is much in excess of other known forms of construction proportional to their weight. The axles are formed from sheet metal and are die-pressed to form hollow axles having flange parts secured in the plane of the line or lines of direction in which the normal load presses against the axle. The axles are preferably formed of sheet steel that can be heat treated and tempered and the welded parts normalized.

The load supporting axle 1 shown in Figs. 1 to 4 is formed of two parts 2 and 4 that are shaped from blanks cut from sheet steel. The blanks are cut in forms such that when shaped by die-pressing they will produce the desired final axle shape when assembled. The parts 2 and 4 are die-pressed to form substantially semi-cylindrical wall parts 5 and 7 and flange parts 8 and 10. The flange parts 8 and 10 are turned inwardly with respect to the semi-cylindrical wall parts.

The ends of the parts 2 and 4 are provided with tongues 11. Preferably the ends of the parts 2 and 4 are flattened as at 12, and the corners of the semi-cylindrical parts contiguous to the flattened portions are cut to form the tongues 11 and circular edges 14. When the parts 2 and 4 are placed together to locate the flanges 8 and 10 in contact with each other, a slot 15 will be formed intermediate the top and bottom edges of the tongues 11 in the wall of the axle. Thus, each end of the axle wall will be provided with semi-circular edges at the bases of the tongues. When the parts 2 and 4 are joined together, stub axle bearing, such as the cylindrical bushings 17, may be inserted intermediate the tongues and so as to fit the curved edges that extend intermediate the bases of the tongues, and the end portions of the tongues may be bent cylindrically about the stub axle bearings and welded together and to the bushings.

The flanges 8 and 10 being inturned with respect to the semi-cylindrical wall parts 5 and 7, V-shaped recesses are formed intermediate the flanges and contiguous to the wall parts and afford an efficient contour for receiving welding metal. The flange portions are welded as at 18 and along the edge portions of the flanges contiguous to the parts 5 and 7 that form the walls of the hollow axle.

When the axle 1 is mounted on the supporting wheels of the vehicle by means of the stub axles of the wheels, the king pins or bearing pins of the stub axle support the axle in such a position that the flanges 8 and 10 will be located in substantially vertical planes for withstanding the bending strains to which the axle may be subjected by the load. The axle being formed substantially cylindrical, the wall will sustain, compared to its weight, the torsional strains to which the axle may be subjected, which are excessive when brakes are applied to the front or guiding wheels.

The form of axle illustrated in Figs. 5 and 6 is similar to the form of construction shown in Figs. 1 to 4. In the form shown in Fig. 5 the flange parts of the axle 21 extend outwardly. The axle 21 is formed from blanks that are cut to a configuration, such as to produce the desired axle shape when assembled. The blanks are die-pressed to form the parts 22 having substantially semi-cylindrical wall parts 23 and flange parts 24 which are turned outwardly with respect to the wall parts. When the flanges of the parts 22 are brought together, a substantially cylindrical axle is formed having contacting, outwardly extending flange parts. The flange parts are welded together by welding along the edges of the flanges as indicated at 28.

The ends of the parts 22 may be flattened or the metal of the ends of the blanks may be retained in the plane of the metal of the blanks. In either case, the metal may be cut to form the tongues 30. They are formed by cutting upper and lower corner portions of opposite ends of the axle curvedly as at 31 to form slots intermediate the tongues 30 when the parts 22 are joined together, and produce semi-circular edge parts at the bases of the tongues as in the form of axle shown in Figs. 1 to 4. Stub-axle bearings, such as the bushings 17, shown in Fig. 1, may be inserted intermediate the tongues 30 and secured in the same manner that the bushings 17 are secured in the axle shown in Fig. 1.

The laterally extending flanges 24 that are welded together provide a means for connecting the axle to the vehicle. Suitable spring pads or saddles 32 having recesses 34 that substantially fit the welded flanges 24, may be placed on the axle 21. The interengagement of the pads and the flange parts will prevent slipping of the axle relative to the saddles 32. The pads or saddles may be secured by suitable U-bolts 35 and the nuts 36 to the springs 37 which are secured to the vehicle in the manner well known in the art. The flange parts 24 are thus secured in the planes of the lines of pressure of the normal load component to which the axle is subjected.

In the form of axle shown in Fig. 7, the wall parts may be formed from a single blank, such as shown in Fig. 8. The space enclosing wall parts of the axle 41 are formed from the central portions 42 of the blank 44 and flange parts 45 are formed from edge portions 47 of the blank. The flange parts 45 are bent to positions inclined to one of the surfaces of the blank, and then the central part 42 of the blank is curvedly bent to bring the lateral outer surfaces of the flange parts 45 in contact with each other and locate the flange parts so that they extend inwardly or outwardly. Preferably, the flanges are located within the cylindrical wall. The inwardly turned flange parts 45, as shown in Fig. 7, form a V-shaped recess 48, within which welding material is disposed and welded. The flange parts 45 are thus welded together along the edge portions of the flange parts and contiguous to the wall parts of the axle. Preferably, in advance of the shaping of the axle, tongues 50 are cut from the opposite ends of the blank so that when the flange parts have been welded together, the tongues 50 will project endwise from the opposite ends of the axle. Bushings, such as the bushings 17 shown in Fig. 1 may be located intermediate the tongues and the ends of the tongues may be bent cylindrical to engage the bushings, and the ends of the tongues may be welded together and to the bushings. When the axle is mounted in a vehicle, the flanges 45 of the axle will thus be secured in planes of the lines of pressure of the load to be sustained by the axle.

In the form of axle or truss illustrated in Fig. 9, the flanges are extended so that when the sheet metal blank is formed, they will extend from certain of the side wall parts of the member to the opposite wall parts of the member, and when the flange parts are located in the plane of the line or lines of the direction of pressure of the load member, a part of the pressure will be transmitted through the flange parts and directly sustained by the upper and lower wall parts and the flange parts. The load sustaining member may be formed rectangular as shown in Fig. 9 or may be formed cylindrical to produce the axles shown in Figs. 11 to 15. In the form of axle shown in Fig. 9 the flange parts 57 are formed from edge portions 56 of the blank 55. They are bent at right angles to the body of the blank 55, such as upwardly, in advance of forming the body of the member, and then the blank 55 is bent along lines to form rectangular wall parts 58, 60, and 61 and to locate contiguous wall parts at right angles to each other.

The dimensions of the wall parts are such as to locate the flange parts in a plane equi-distant from opposite side wall parts and to extend from certain of the wall parts of the axle to opposite wall parts as indicated in Fig. 9. The central part of the end edge portions of the blank 55 is provided with slots 62 that will be located in the ends of the wall 58 when the blank is shaped. Also, the corners of the blank may be trimmed to permit folding the end portions of the flanges 57 against the side wall 60. This produces flaring of end portions of the flanges 57 where they are separated to locate the end portions of the flanges in contact with the side wall parts 60 and in butting relation with the wall part 58 along the edge of the slot 62. The flaring and folding of the flange parts form slotted openings in the ends of the axle 54 and tongues that extend endwise from the side walls 60 of the axle. The tongues are formed of two layers of the sheet metal by the folding of portions of the ends of the flanges to the side walls 60 of the axle. Stub axle bearings, such as the bushings 17 shown in Fig. 1 may be inserted intermediate the tongues, and the ends of the tongues may be bent cylindrically with respect to the bushings and the ends of the tongues may be welded together and to the bushings. Thus, the flange parts 57 may be located in the plane of the lines of the normal load of the front end of the vehicle in which the axle may be structurally included.

In the form of construction illustrated in Figs. 11 to 13, the axle 67 is formed cylindrical, as distinct from rectangular, in its cross-section from a blank similar to the blank 55 from which the truss member or axle 54 is formed. The flange parts 65 of the axle 67 are formed from the edge portions of the blank, and the cylindrical wall 68 of the axle 67 is formed from the central portion of the blank. The side edge portions of the blank are bent to one side of the plane of the body of the blank to form the flange parts, and the central portion of the blank is bent curvedly until the exterior lateral surfaces of the flange parts 65 are brought into contact with each other, and preferably to locate the flange parts within the cylindrical wall of the axle. The flange parts 65 have widths substantially the same as the diameter of the cylindrical wall 68. This will locate the edges of the flange parts 65 in contact with the interior surface of the side wall part opposite to the side wall parts located contiguous to the edge portions of the flanges where they are integrally connected to the wall parts. The flange parts 65 thus extend diametrically through the interior of the shell from one side part of the shell to the opposite side part. The flanges are welded contiguous to the wall parts along the V-shaped recesses formed between the wall parts by the welding material 70.

The ends of the shell are preferably shaped to produce rectangular cross-sectional forms from end portions of the blank and so as to form the planar side walls 71 from the metal located at opposite sides of the slots 62 formed in the blank. The end portions 72 of the flanges 65 are flared, as at 74, and brought into contact with the side walls 71. They are folded along the end portions of the side walls 71 as at 75 and their edges are trimmed so as to abut edge portions located at the sides of the slot 62. The portions 71 and 72 thus form tongues 76, and the flaring portions 75 form substantially semi-cylindrical surfaces that have inner diameters substantially the same as the semi-circular edges of the slots 62. The end edges of the tongues are ground to square their ends, and stub axle bearings, such as the bushings 17 shown in Fig. 1, may be inserted intermediate the tongues, and the tongues may be bent around the bushings and welded to each other and to the bushing and thus dispose the flange parts 65 in the plane of the lines of pressure of the load sustained by the axle when the axle is mounted in the vehicle.

The form of construction shown in Figs. 14 and 15 is similar to that shown in Figs. 11 to 13, except that in the form of construction shown in Figs. 14 and 15 the flange parts have portions that are flared from each other to dispose edges of the flange parts substantially parallel and along substantially parallel lines that are spaced from each other, whereby the pressure of the load will be transmitted through the flange parts from upper wall parts of the axle to lower wall parts of the axle and along substantially parallel spaced lines. The axle 78 illustrated in Figs. 14 and 15 is formed from a blank similar to that shown in Fig. 10 from which the axle shown in Fig. 9 is formed. The flange parts 77 are formed by bending the edge portions of a blank along lines disposed distances substantially the length of the interior radius of the cylindrical wall part 80 from the side edges of the blank to form the portions 81 of the flange parts 77. Also, the blank is bent to locate the flange parts 77 in a direction inclined to the surface of the blank and to form the portions 82 of the flange parts 77. The central part of the blank is then bent curvedly until the portions 82 of the flange parts 77 are brought into contact which disposes edges of the portions 81 of the flange parts 77 against the wall parts of the axle at points spaced from each other. Preferably the portions 81 are inclined 120° relative to the portions 82 of the flanges 77 which disposes edges of the flanges equi-distant around the cylindrical wall of the axle, as measured circularly, to produce a maximum resistance to the pressure component of the load sustained by the axle when mounted in the vehicle. The flanges 77 are welded contiguous to the wall parts 80 along the V-shaped recess formed between the wall parts, by the welding material 86.

The end parts of the axle 78 are formed to have tongues identical in form and construction to those formed in connection with the axle 67 illustrated in Figs. 11 to 13. The relative flaring portions 81 of the flange parts 77 are, at the ends of the axle, brought together as at 84, and the end portions of the axle are flattened as at 85, and the flange portions are folded to the flattened portions 85. The flanges 77 are flared to form the flaring portions 87. Corner portions of the flange parts are trimmed so that when folded they may be disposed along the edge portions of the slot 62 formed in the blank. The folding of the metal at the ends of the axle and disposing the side end edge parts of the flange parts along the edge of the slot 62 form channels or slots that extend through the ends of the hollow cylindrical member.

The slots thus formed have cylindrical interior surfaces at their rear ends and lateral side surfaces that form the tongues 88. The ends of the tongues 88, formed of the double layer of the metal of the sheet produced by folding of the metal, are ground to square the ends with the side edges of the tongues. Stub axle bearings, such as the cylindrical bushings 17 of the form of axle shown in Fig. 1 may be inserted in the slots thus formed, and the tongues are bent around the outer side of each bushing and welded to each other and to the bushing. When the axle is mounted in the vehicle, the portions 82 are located substantially in the plane of the lines of load pressure.

I claim:

An automobile axle formed from sheet metal bent to form oppositely disposed wall parts and flange parts oppositely and inwardly extending from the edges of the wall parts and welded together along edge portions of the flange parts to form a tubular cylindrical axle, the wall parts having tongues protruding endwise with respect to the wall parts and in planes parallel to the plane of the flange parts and forming top and bottom end-slots, the flange parts extending from the end-slot at one end of the axle to the end-slots of the other end of the axle, bearing members located in the end-slots, the tongues having end portions bent arcuately about the bearing members and welded together and forming stub axle bearing supporting parts at the ends of the axle.

BERTIS H. URSCHEL.